United States Patent [19]

Negri et al.

[11] 4,142,494
[45] Mar. 6, 1979

[54] TURBOCHARGED ENGINE WITH VACUUM BLEED VALVE

[75] Inventors: Joseph M. Negri, Fenton; Thomas F. Wallace, Grand Blanc, both of Mich.

[73] Assignee: General Motors Corporation, Detroit, Mich.

[21] Appl. No.: 838,588

[22] Filed: Oct. 3, 1977

[51] Int. Cl.² ............................................. F02B 33/00
[52] U.S. Cl. ................................................. 123/119 C
[58] Field of Search ........................ 123/119 C, 117 A

[56] References Cited

U.S. PATENT DOCUMENTS

| | | | |
|---|---|---|---|
| 1,955,037 | 4/1934 | Viel | 123/119 C |
| 2,223,381 | 12/1940 | Mock | 123/119 C X |
| 2,380,967 | 8/1945 | Jarvis | 123/117 A |
| 2,383,898 | 8/1945 | Udale | 123/117 A |
| 2,390,166 | 12/1945 | Parkins et al. | 123/119 C X |
| 2,538,377 | 1/1951 | Ostling | 123/119 C X |

Primary Examiner—Carlton R. Croyle
Assistant Examiner—Michael Koczo, Jr.
Attorney, Agent, or Firm—C. K. Veenstra

[57] ABSTRACT

A turbocharged internal combustion engine has a carburetor fuel metering control rod, an ignition timing control member, an exhaust gas recirculation control pintle, and an induction air temperature control damper operated in response to vacuum signals created by the pressure in the induction passage between the throttle and the turbocharger compressor and a valve which bleeds the vacuum signals to atmospheric pressure when the compressor discharge pressure rises above a selected value to establish a rich air-fuel mixture, retard ignition timing, inhibit exhaust gas recirculation and provide cool induction air flow for maximum power operation.

5 Claims, 3 Drawing Figures

TURBOCHARGED ENGINE WITH VACUUM BLEED VALVE

This invention relates to a turbocharged internal combustion engine having a control device operated in response to a vacuum signal created by the pressure in the induction passage between the throttle and the turbocharger compressor.

A naturally aspirated internal combustion engine is conventionally equipped with a fuel metering control rod, an ignition timing control member, an exhaust gas recirculation control pintle, and an induction air temperature control damper which are positioned by vacuum units responsive to vacuum signals created by the subatmospheric pressure in the induction passage downstream of the throttle. When maximum power is demanded from such an engine, that induction passage pressure approaches atmospheric pressure and the fuel metering control rod is then positioned to establish a rich air-fuel mixture, the ignition timing control member to retard the timing, the exhaust gas recirculation control pintle to inhibit recirculation and the induction temperature control damper to provide cool air flow.

When maximum power is demanded from a turbocharged engine, however, the pressure in the induction passage between the throttle and the turbocharger compressor decreases instead of approaching atmospheric pressure. Thus if conventional naturally aspirated engine controls were used on a turbocharged engine, the vacuum signals created by such pressure would establish a lean air-fuel mixture instead of a rich mixture, advance instead of retarding ignition timing, permit instead of inhibiting recirculation of exhaust gases, and provide warm instead of cool induction air flow during maximum power demands, and in certain applications one or more of these conditions may be unsatisfactory.

This invention allows conventional naturally aspirated engine controls to be used on a turbocharged engine by providing a bleed valve which responds to the power demand placed on the engine—represented by the pressure in the induction passage downstream of the compressor—and which causes one or more of the aforementioned engine control vacuum signals to approach atmospheric pressure during maximum power demands to thereby establish a rich air-fuel mixture, retard ignition timing, inhibit recirculation of exhaust gases and/or provide cool induction air flow.

The details as well as other features and advantages of this invention are set forth in the following description of a preferred embodiment and are shown in the drawing in which.

Figure 1:
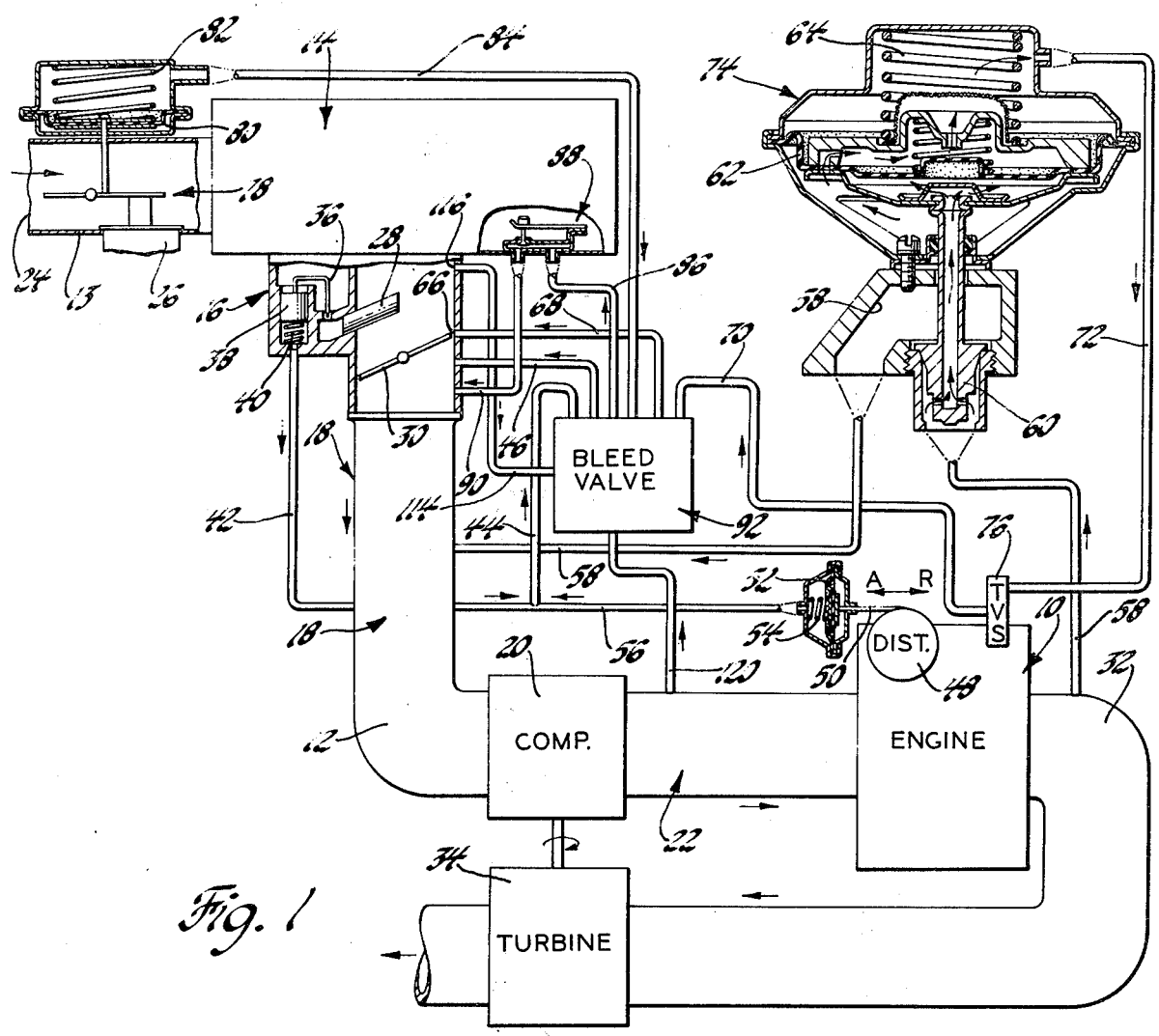
FIG. 1 is a schematic view of an engine embodying this invention.

Referring first to FIG. 1, an internal combustion engine 10 includes an induction passage 12 which extends through an air cleaner snorkel 13, air cleaner 14, a carburetor 16, a carburetor discharge plenum 18, a turbocharger compressor 20 and an intake manifold 22. Snorkel 13 has a cool air inlet 24 for receiving air at the ambient atmospheric temperature and a warm air inlet 26 for receiving air heated by, for example, the engine exhaust system. Carburetor 16 includes a fuel inlet 28 which opens into induction passage 12 and a throttle 30 for controlling air flow through induction passage 12.

Engine 10 also includes an exhaust passage 32 with a turbine 34 driven by exhaust gas flow therethrough to drive compressor 20 and thus increase air flow through induction passage 12 to engine 10.

A fuel metering control rod 36 disposed in fuel inlet 28 is carried on a vacuum piston 38 and is biased by a spring 40 to a projected position permitting increased fuel flow through inlet 28 to establish a rich air-fuel mixture. Piston 38 is subjected to the subatmospheric pressure (vacuum signal) in induction passage 12 between the throttle 30 and compressor 20 through vacuum lines 42, 44 and 46 and upon a decrease in such pressure (an increase in vacuum signal), moves metering rod 36 to a retracted position in which it restricts fuel flow through inlet 28 to establish a lean air-fuel mixture.

Engine 10 also includes a distributor 48 having an ignition timing control member 50. Control member 50 is carried on a vacuum diaphragm 52 and is biased by a spring 54 to a projected position in which the ignition timing is retarded. Diaphragm 52 is subjected to the subatmospheric pressure (vacuum signal) in induction passage 12 between throttle 30 and compressor 20 through vacuum lines 56, 44 and 46 and upon a decrease in such pressure (an increase in vacuum signal), moves control member 50 to a retracted position in which the ignition timing is advanced.

Each of the items mentioned heretofore may be of conventional construction well-known to those skilled in the art and thus need not be described to any further extent.

Engine 10 also has an exhaust gas recirculation passage 58 extending from exhaust system 32 to induction passage 12 between throttle 30 and compressor 20. An exhaust gas recirculation control pintle 60 disposed in passage 58 is carried by a vacuum diaphragm 62 and is biased by a spring 64 toward the projected position shown in which it inhibits recirculation of exhaust gases through passage 58. Diaphragm 62 is subjected to the vacuum signal created at a port 66 opening into induction passage 12 adjacent throttle 30 through vacuum lines 68, 70 and 72 and thus senses the substantially atmospheric pressure upstream of throttle 30 when throttle 30 is closed as shown and the subatmospheric pressure created in induction passage 12 between throttle 30 and compressor 20 when throttle 30 is open. Thus during open throttle operation, diaphragm 62 moves pintle 60 to a retracted position in which it permits flow of exhaust gases through passage 58. In this embodiment, pintle 60, diaphragm 62 and spring 64 are incorporated in an exhaust gas recirculation valve 74 which further controls the vacuum signal applied to diaphragm 62 so that the flow of exhaust gases through passage 58 varies with the pressure in exhaust system 32 and thus is proportional to the flow through induction passage 12. Such valve assemblies are well-known to those skilled in the art and operate in the manner described in U.S. Pat. No. 3,834,366 issued Sept. 10, 1974 in the name of W. L. Kingsbury, although they may differ in certain details of construction from the specific embodiments disclosed therein. Moreover, in some applications other types of vacuum operated exhaust gas recirculation control valve assemblies may be used, and thus the specific structure of valve assembly 74 need not be described in greater detail.

If desired, engine 10 may include a thermal vacuum switch 76 which passes the vacuum signal from vacuum line 70 to vacuum line 72 during engine operation at normal temperatures but which obstructs the vacuum signal and instead applies atmospheric pressure to diaphragm 62 at low engine temperatures. Thus during engine operation at low temperatures, spring 64 would move pintle 60 to the projected position to inhibit recirculation of exhaust gases.

An induction air temperature control damper 78 disposed in snorkel 13 is connected to a vacuum diaphragm 80 and is biased by a spring 82 to the projected position shown, inhibiting warm air flow through warm air inlet 26 and permitting cool air flow through cool air inlet 24. Diaphragm 80 is subjected to the subatmospheric pressure in induction passage 12 between throttle 30 and compressor 20 through vacuum lines 84 and 86, a thermal sensor 88 disposed in air cleaner 14, and a vacuum line 90. When the induction air flow temperature is below a selected value, sensor 88 passes the subatmospheric pressure (vacuum signal) to diaphragm 80 which then retracts damper 78 to inhibit cool air flow through cool air inlet 24 and permit warm air flow through warm air inlet 26, but when the induction air flow temperature is above the selected value, sensor 88 opens an air bleed which causes the vacuum signal to approach atmospheric pressure and spring 82 to move the damper toward the projected position shown. The components of air cleaner 14 operate generally as described in U.S. Pat. No. 3,444,847 issued May 20, 1969 in the name of J. B. King, and while the details of construction may differ in certain respects from those shown in that patent, various embodiments are well-known to those skilled in the art; thus air cleaner 14 need not be described in greater detail.

As throttle 30 is opened to increase the power demand on the engine it would be desired to have spring 40 lift vacuum piston 38 and fuel metering control rod 36 to a projected position permitting increased fuel flow through fuel inlet 28 to provide a rich air-fuel mixture. In general, it also would be desired to have spring 54 move diaphragm 52 and ignition timing control member 50 to the projected position in which the ignition timing is retarded, to have spring 64 move diaphragm 62 and exhaust gas recirculation control pintle 60 to the projected position in which recirculation of exhaust gases through passage 58 is inhibited, and/or to have spring 82 move diaphragm 80 and control damper 78 to the projected position in which it inhibits warm air flow through warm air inlet 26 and permits cool air flow through cool air inlet 24. However, if throttle 30 is opened to increase the power demand on the engine, compressor 20 causes a decrease, rather than an increase, in the pressure in induction passage 12 between throttle 30 and compressor 20. Thus in the absence of the bleed valve provided by this invention, fuel metering control rod 36, ignition timing control member 50, exhaust gas recirculation control pintle 60, and induction air temperature control damper 78 all would be held in the retracted rather than the projected positions.

Figure 2:
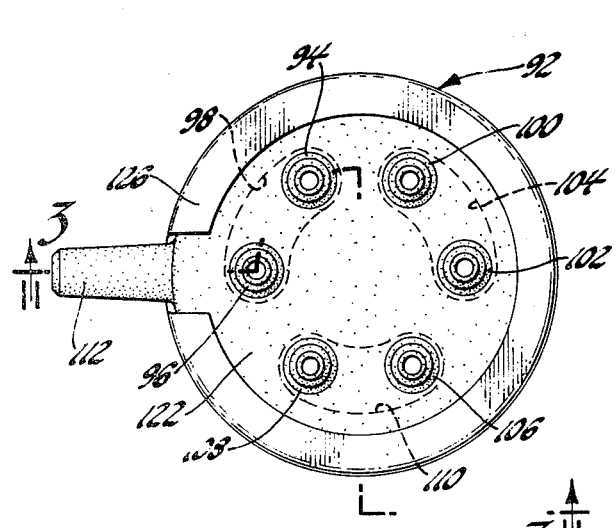
FIG. 2 is an enlarged plan view of the bleed valve.

This invention provides a bleed valve 92 which interconnects vacuum line 44 with vacuum line 46, vacuum line 68 with vacuum line 70, and vacuum line 84 with vacuum line 86. As shown in FIG. 2, bleed valve 92 has a fitting 94 for connection to vacuum line 44, a fitting 96 for connection to vacuum line 46, and an arcuate chamber 98 for interconnecting fittings 94 and 96 and thus vacuum lines 44 and 46. Bleed valve 92 also has a fitting 100 for vacuum line 68, a fitting 102 for vacuum line 70, and an arcuate chamber 104 for interconnecting fittings 100 and 102 and thus vacuum lines 68 and 70. Bleed valve 92 further has a fitting 106 for vacuum line 86, a fitting 108 for vacuum line 84, and an arcuate chamber 110 for interconnecting fittings 106 and 108 and thus vacuum lines 84 and 86.

Bleed valve 92 also includes a fitting 112 for connection through a line 114 to a source of clean air such as a port 116 in induction passage 12 upstream of fuel inlet 28. Bleed valve 92 further includes a fitting 118 for connection through a line 120 to sense the compressor discharge pressure in intake manifold 22.

Figure 3:
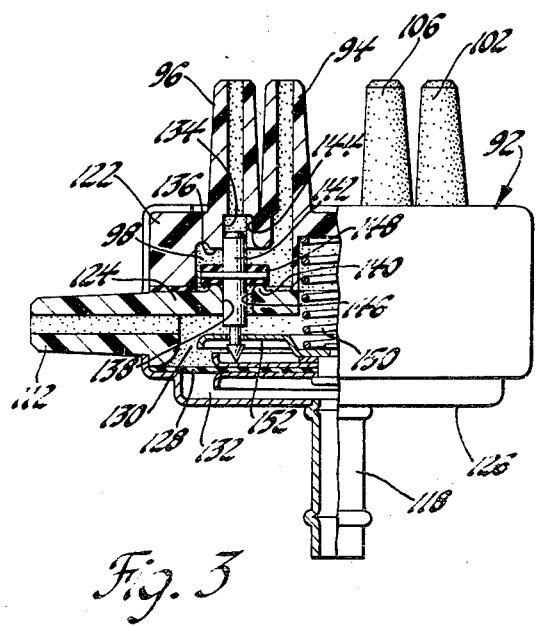
FIG. 3 is an elevational view of the bleed valve, with parts broken away as suggested by lines 3—3 of FIG. 2, to illustrate its internal details of construction.

As shown in FIG. 3, bleed valve 92 includes an upper portion 122 in which fittings 94, 96, 100, 102, 106 and 108 are formed, an intermediate portion 124 in which fitting 112 is formed, and a cupper lower portion 126 which carries fitting 118. Lower portion 126 is formed from sheet metal to extend about the sides of portions 124 and 122 and is crimped over the top of portion 122, as shown in FIG. 2, to secure the various portions together. Thus arcuate chambers 98, 104 and 110 are actually formed by recesses in upper portion 122 which are closed by intermediate portion 124.

A diaphragm 128 disposed between intermediate portion 124 and lower portion 126 forms a clean air chamber 130 between intermediate member 124 and diaphragm 128 and a compressor discharge pressure chamber 132 between diaphragm 128 and lower portion 126. Fitting 112 opens into clean air chamber 130, and fitting 118 opens into compressor discharge pressure chamber 132.

Fitting 96 opens into arcuate chamber 98 through a bore 134 surrounded by a valve seat 136, and clean air chamber 130 opens into arcuate chamber 98 through a bore 138 surrounded by a valve seat 140. A valve stem 142 is guided in bores 134 and 138, while grooves 144 and 146 in bores 134 and 138 permit flow about valve stem 142. Valve stem 142 carries a double-faced valve member 148 and is biased by a spring 150 and a carrier plate 152 to engage valve member 148 against valve seat 140; in this position the vacuum signal is transmitted from vacuum line 46 through fitting 96 and arcuate chamber 98 to fitting 94 and vacuum line 44.

When the compressor discharge pressure in intake manifold 22 rises above a selected value indicative of high engine power demands, a value of 2"-4" Hg above atmospheric pressure for example, diaphragm 128 overcomes the bias of spring 150 and pushes valve stem 142 upwardly to engage valve member 148 with valve seat 136. The atmospheric pressure in clean air chamber 130 is then applied through arcuate chamber 98 and fitting 94 to vacuum line 44, and spring 40 lifts piston 38 and fuel metering control rod 36 to the projected position permitting increased fuel flow through fuel inlet 28 to establish a rich air-fuel mixture. Simultaneously, spring 54 moves diaphragm 52 and ignition timing control member 50 to the projected position to retard ignition timing.

Arcuate chambers 104 and 110 have an identical construction and contain identical double-faced valve members so that when the compressor discharge pressure in intake manifold 22 rises above a selected value, spring 64 moves diaphragm 62 and exhaust gas recirculation control pintle 60 to the projected position for inhibiting recirculation of exhaust gases and at the same time spring 82 moves diaphragm 80 and induction air control damper 78 to the projected position for providing cool induction air flow.

Accordingly, it will be appreciated that this invention provides a bleed valve which responds to the high compressor discharge pressure generated during maximum engine power demand and which causes one or more of the engine control vacuum signals to approach atmospheric pressure notwithstanding the fact that the induction passage pressure which creates those signals is very low under such conditions. Thus one or more of the engine controls may be moved to its projected position for maximum power operation.

The embodiments of the invention in which an exclusive property or privilege is claimed are defined as follows:

1. A turbocharged internal combustion engine including an induction passage for air flow to the engine, a throttle in said induction passage for controlling air flow therethrough, an exhaust passage for exhause gas flow from the engine, a turbine in said exhaust passage driven by exhaust gas flow therethrough, a compressor in said induction passage downstream of said throttle driven by said turbine for increasing air flow to the engine, an engine control device movable between retracted and projected positions, and a vacuum unit responsive to a vacuum signal created by subatmospheric pressure in said induction passage between said throttle and said compressor for moving said control device toward said retracted position as said pressure decreases and for moving said control device toward said projected position as said pressure increases, and wherein the improvement comprises a bleed valve responsive to discharge pressure created in said induction passage downstream of said compressor for causing said vacuum signal to approach atmospheric pressure and thereby causing said vacuum unit to move said control device toward said projected position when said discharge pressure rises above a selected value.

2. A turbocharged internal combustion engine including an induction passage for air flow to the engine, a throttle in said induction passage for controlling air flow therethrough, an exhaust passage for exhaust gas flow from the engine, a turbine in said exhaust passage driven by exhause gas flow therethrough, a compressor in said induction passage downstream of said throttle driven by said turbine for increasing air flow to the engine, said induction passage having a fuel inlet, a fuel metering control rod in said fuel inlet and movable between a retracted position restricting fuel flow through said inlet to provide a lean air-fuel mixture and a projected position permitting increased fuel flow through said inlet to provide a rich air-fuel mixture, and a vacuum unit responsive to a vacuum signal created by subatmospheric pressure in said induction passage between said throttle and said compressor for moving said metering control rod toward said retracted lean mixture position as said pressure decreases and for moving said metering control rod toward said projected rich mixture position as said pressure increases, and wherein the improvement comprises a bleed valve responsive to discharge pressure created in said induction passage downstream of said compressor for causing said vacuum signal to approach atmospheric pressure and thereby causing said vacuum unit to move said metering control rod toward said projected rich mixture position when said discharge pressure rises above a selected value.

3. A turbocharged internal combustion engine including an induction passage for air flow to the engine, a throttle in said induction passage for controlling air flow therethrough, an exhaust passage for exhaust gas flow from the engine, a turbine in said exhaust passage driven by exhaust gas flow therethrough, a compressor in said induction passage downstream of said throttle driven by said turbine for increasing air flow to the engine, an ignition timing control member movable between a retracted position providing advanced ignition timing and a projected position providing retarded ignition timing, and a vacuum unit responsive to a vacuum signal created by subatmospheric pressure in said induction passage between said throttle and said compressor for moving said ignition timing control member toward said retracted advanced ignition timing position as said pressure decreases and for moving said ignition timing control member toward said projected retarded ignition timing position as said pressure increases, and wherein the improvement comprises a bleed valve responsive to discharge pressure created in said induction passage downstream of said compressor for causing said vacuum signal to approach atmospheric pressure and thereby causing said vacuum unit to move said ignition timing control member toward said projected retarded ignition timing position when said discharge pressure rises above a selected value.

4. A turbocharged internal combustion engine including an induction passage for air flow to the engine, a throttle in said induction passage for controlling air flow therethrough, an exhaust passage for exhaust gas flow from the engine, a turbine in said exhaust passage driven by exhaust gas flow therethrough, a compressor in said induction passage downstream of said throttle driven by said turbine for increasing air flow to the engine, a recirculation passage extending from said exhaust passage to said induction passage, an exhaust gas recirculation control valve movable between a retracted position permitting exhaust gas flow through said recirculation passage and a projected position inhibiting exhaust gas flow through said recirculation passage, and a vacuum unit responsive to a vacuum signal created by subatmospheric pressure in said induction passage between said throttle and said compressor for moving said recirculation control valve toward said retracted flow permitting position as said pressure decreases and for moving said recirculation control valve toward said projected recirculation inhibiting position as said pressure increases, and wherein the improvement comprises a bleed valve responsive to discharge pressure created in said induction passage downstream of said compressor for causing said vacuum signal to approach atmospheric pressure and thereby causing said vacuum unit to move said recirculation control valve toward said projected recirculating inhibiting position when said discharge pressure rises above a selected value.

5. A turbocharged internal combustion engine including an induction passage for air flow to the engine, a throttle in said induction passage for controlling air flow therethrough, an exhaust passage for exhaust gas flow from the engine, a turbine in said exhaust passage drived by exhaust gas flow therethrough, a compressor in said induction passage downstream of said throttle driven by said turbine for increasing air flow to the engine, said induction passage having a warm air inlet and a cool air inlet and an induction air temperature control damper movable between a retracted position permitting warm air flow through said warm air inlet and inhibiting cool air flow through said cool air inlet and a projected position permitting cool air flow through said cool air inlet and inhibiting warm air flow through said warm air inlet, and a vacuum unit responsive to a vacuum signal created by subatmospheric pressure in said induction passage between said throttle and said compressor for moving said temperature control damper toward said retracted warm air flow position as said pressure decreases and for moving said temperature control damper toward said projected cool air flow position as said pressure increases, and wherein the improvement comprises a bleed valve responsive to discharge pressure created in said induction passage downstream of said compressor for causing said vacuum signal to approach atmospheric pressure and thereby causing said vacuum unit to move said temperature control damper toward said projected cool air flow position when said discharge pressure rises above a selected value.

* * * * *